Oct. 22, 1963    R. L. McLEAN    3,107,752
TEMPERATURE COMPENSATED VISCOUS DAMPER
Filed Aug. 4, 1961

INVENTOR.
Ronald L. McLean
BY Ralph Hammar
attorney

United States Patent Office

3,107,752
Patented Oct. 22, 1963

3,107,752
TEMPERATURE COMPENSATED VISCOUS
DAMPER
Ronald L. McLean, Erie, Pa., assignor to Lord Manufacturing Company, Erie, Pa., a corporation of Pennsylvania
Filed Aug. 4, 1961, Ser. No. 129,454
5 Claims. (Cl. 188—87)

This invention is a viscous damper constructed to compensate for the changes in viscosity with temperature. In a preferred form, damping is exerted in all directions, angular and translation.

Figure 1:
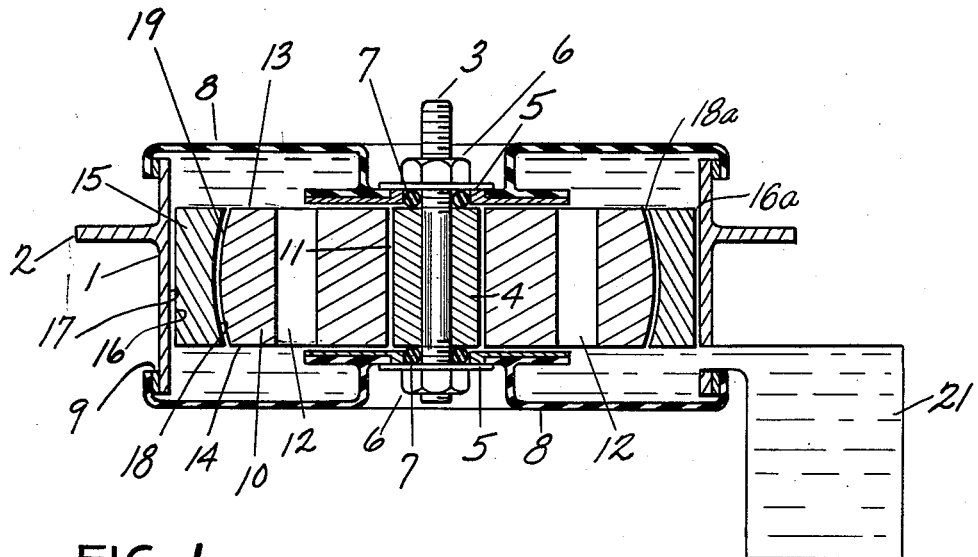
Figure 2:
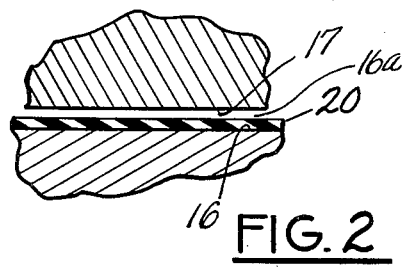

In the drawing, FIG. 1 is a section through a damper and FIG. 2 is an enlarged fragmentary section through adjacent relatively movable surfaces of the damper.

In the preferred form of damper illustrated, there is an outer casing 1 having a mounting flange 2. At the center of the casing is a stud 3 carrying a spacer 4 having discs 5 clamped to opposite ends thereof by nuts 6. Sealing rings 7 are arranged between each of the discs 5 and the adjacent end of the spacer 4. The metal parts so far described may be made of steel or other metal having a relatively low coefficient of expansion. The upper and lower ends of the casing are each closed by flexible diaphragms 8 of rubber or other suitable elastomer. The inner edge of each of the diaphragms 8 is bonded to one of the discs 5 and the outer edge is bonded to a ring 9 suitably fastened to the casing. The rubber diaphragms 8 not only permit relative movement between the stud 3 and the casing 1 but also accommodate thermal expansion of the damping fluid with which the casing is filled.

Between the discs 5 is a ring 10 having a clearance hole 11 at the center with a substantial clearance between it and the spacer 4 and also having a plurality of holes 12 so that as the ring moves, no pressure is built up in the damping fluid between the upper and lower sides 13 and 14 of the ring. The ring 10 is made of a metal having a relatively high coefficient of expansion such as aluminum.

Surrounding the ring 10 is a ring 15 having an outer cylindrical surface 16 presented to the inner cylindrical surface 17 of the outer casing 1. The inner surface 18 of the ring 15 is spherical and complementary to an outer surface 19 of the ring 10. The ring 15 is made of a material having a coefficient of expansion intermediate steel and aluminum such as brass.

In use, the damper is connected between relatively movable members, one being connected to the stud 3 and the other to the housing 1, for example through its mounting flange 2. When so installed, relative movement in any direction, angular or translation, is resisted by a force directly proportional to the viscosity of the damping fluid and inversely proportional to the clearance between the relatively movable surfaces of the damper. The viscosity of the damping fluid is subject to change with temperature, becoming more viscous as the temperature falls and less viscous as the temperature rises. Because of the differences in thermal coefficients of expansion, the clearances between the relatively movable parts of the damper also change with temperature, the clearances becoming greater at low temperatures when the fluid is more viscous and smaller at high temperatures when the fluid is less viscous. Accordingly, there is temperature compensation of the damping force.

Motions in a vertical direction are resisted by shearing of the fluid in the space 16a between cylindrical surfaces 16 and 17. For this direction of movement, the rings 10 and 15 move together because, in effect, they share the same spherical surface 18, 19. Since the housing 1 is made of steel and the ring 15 is made of brass, the clearance between the surfaces 16 and 17 becomes less as the temperature increases.

Motion in any horizontal direction is resisted by shear of the fluid between discs 5 and the upper and lower surfaces 13, 14 of the ring 10. Since the ring 10 is aluminum and the spacer and discs 5 are of steel, the spacing between the discs 5 and the surfaces 13 and 14 of the ring 10 becomes greater when the temperatures are low and less when the temperatures are high. This is in the proper direction to compensate for temperature effects.

Angular motions in any direction are damped by relative movement between the spherical surfaces 18 and 19 on the rings 15 and 10. The ring 10 is compelled to move angularly with the stud 3 while angular movement of the ring 15 is restrained by the cylindrical surface 17 of the housing 1. Accordingly, there is a shear of the fluid in the space 18c between the surfaces 18 and 19 which introduces a viscous damping force. Since the thermal expansion of the aluminum ring 10 is greater than the thermal expansion of the brass ring 5, the spacing between the surfaces 18 and 19 is greater at low temperatures than at high temperatures.

The clearance between the relatively movable surfaces of the damper is quite small, frequently as little as five thousandths of an inch or less, and although the damping fluids are usually oils with lubricating properties, it is desirable that at least one of each of the relatively movable surfaces be coated with a film 20 having lubricating properties which may, for example, be a tape of "Teflon" bonded throughout to one of the surfaces. This construction is diagrammatically illustrated in FIG. 2.

It will be noted that the rings 10 and 15 float between the discs 5 on the stud 3 and the inner walls of the casing 1, and are accordingly free to equalize the clearance between adjacent surfaces under vibration conditions. The plastic film 20 prevents galling of the relatively movable surfaces by occasional metal-to-metal contact.

When the damper is completely filled with fluid, the temperature compensation is controlled exclusively by the change in clearance between the relatively movable surfaces. The damping fluid also has a coefficient of expansion, usually much greater than the coefficients of expansion of the metal parts, and it is possible to derive a further compensation from the change in volume of the damping fluid. This is accomplished by an expansion tank 21 connected to the casing 1 which has no function when the casing 1 is completely filled. When the casing 1 is only partially filled the level of the liquid in the casing 1 and accordingly the area of contact with the liquid will depend upon the temperature of the liquid. The coefficients of thermal expansion for liquids are greater than for metals. If the tank 21 were omitted and the casing 1 partially filled, there would be some change in liquid level with temperature. The tank 21 increases the change in liquid volume with temperature and increases the change in liquid level in casing 1. At low temperatures, for example, the liquid level might be close to the bottom of the rings 10 and 15 while at high temperatures the liquid level might be close to the top of the rings 10 and 15. This produces a substantial change in the damping which is entirely independent of the expansion of the metal parts of the damper. In fact, the change due to the thermal expansion of the damping fluid would be present even though the metal parts of the damper were made of a material having zero coefficient of thermal expansion.

Because the damping effect is obtained by the shearing of thin films of damping fluid, it is possible to use fluids having very high viscosities, even including greases. This allows wide variation in damping force output of a damper of given size with no other hardware changes.

What is claimed as new is:

1. A damper for connection between two relatively movable parts comprising a casing containing a viscous liquid and having an axially extending inner surface, a ring within the casing having axially spaced end surfaces and an outer surface in telescoping relation to said axially extending surface, a plunger of diameter smaller than and loosely extending through the center of the ring and having washers spaced from opposite ends of the ring and slidably presented toward the end surfaces of the ring, said plunger and ring being submerged in said liquid, and means for connecting the casing to one of said relatively movable parts and for connecting the plunger to the other of said relatively movable parts.

2. The damper of claim 1 in which the ring is of a material having a higher coefficient of expansion than the casing or plunger so the clearance between the ring and the casing and between the ring and the washers decreases as the temperature of the liquid increases.

3. A damper for connection between two relatively movable parts comprising a casing containing a viscous liquid and having an axially extending inner surface, a ring within the casing having axially spaced end surfaces and an outer surface in telescoping relation to said axially extending surface, a plunger of diameter smaller than and loosely extending through the center of the ring and having spaced washers at opposite ends of the ring and slidably presented toward the end surfaces of the ring, a flexible diaphragm connected between each washer and the casing, said plunger and ring being submerged in said liquid, and means for connecting the casing to one of said relatively movable parts and for connecting the plunger to the other of said relatively movable parts.

4. A damper for connection between two relatively movable parts comprising a casing containing a viscous liquid and having an axially extending inner surface and open at both ends, a flexible diaphragm closing each end of the casing, a ring within the casing having axially spaced end surfaces and an outer surface in telescoping relation to said axially extending surface, a plunger of diameter smaller than and loosely extending through the center of the ring and having spaced washers at opposite ends of the ring and slidably presented toward the end surfaces of the ring, said plunger and ring being submerged in said liquid, and means for connecting the casing to one of said relatively movable parts and for connecting the plunger to the other of said relatively movable parts.

5. A damper comprising two relatively movable parts, one part comprising a casing containing a viscous liquid and having an axially extending inner surface, an outer ring within the casing, the outer surface of the ring and said axially extending surface being complementary surfaces receiving said liquid therebetween, an inner ring, the other part comprising a plunger of diameter smaller than and loosely extending through the center of the inner ring, axially spaced washers on one of said parts, one of said rings having axially spaced end surfaces spaced from and slidably presented toward said end surfaces of the washers and providing complementary surfaces receiving said liquid therebetween, said inner and outer rings having complementary outer and inner surfaces respectively receiving said liquid therebetween, one of said complementary surfaces being spherical and the other of said complementary surfaces being cylindrical.

References Cited in the file of this patent

UNITED STATES PATENTS

| | | |
|---|---|---|
| 1,953,819 | Payne | Apr. 3, 1934 |
| 2,182,076 | Elmer | Dec. 5, 1939 |
| 2,271,976 | Hasbrouck et al. | Feb. 3, 1942 |
| 2,417,282 | Wheeler | Mar. 11, 1947 |
| 2,881,870 | Thumim | Apr. 14, 1959 |
| 2,919,883 | Murphy | Jan. 5, 1960 |
| 2,955,471 | Schwartz et al. | Oct. 11, 1960 |

FOREIGN PATENTS

| | | |
|---|---|---|
| 201,389 | Australia | Aug. 4, 1955 |
| 711,430 | Great Britain | June 30, 1954 |